July 9, 1940. A. S. T. LAGAARD 2,207,591
DOUGHNUT MACHINE
Filed Nov. 6, 1939 7 Sheets-Sheet 1

Inventor
Alexander S. T. Lagaard
By Caswell & Lagaard
Attorneys

July 9, 1940.  A. S. T. LAGAARD  2,207,591
DOUGHNUT MACHINE
Filed Nov. 6, 1939  7 Sheets-Sheet 2

Inventor
Alexander S. T. Lagaard
By Caswell & Lagaard
Attorneys

July 9, 1940.  A. S. T. LAGAARD  2,207,591
DOUGHNUT MACHINE
Filed Nov. 6, 1939  7 Sheets-Sheet 3
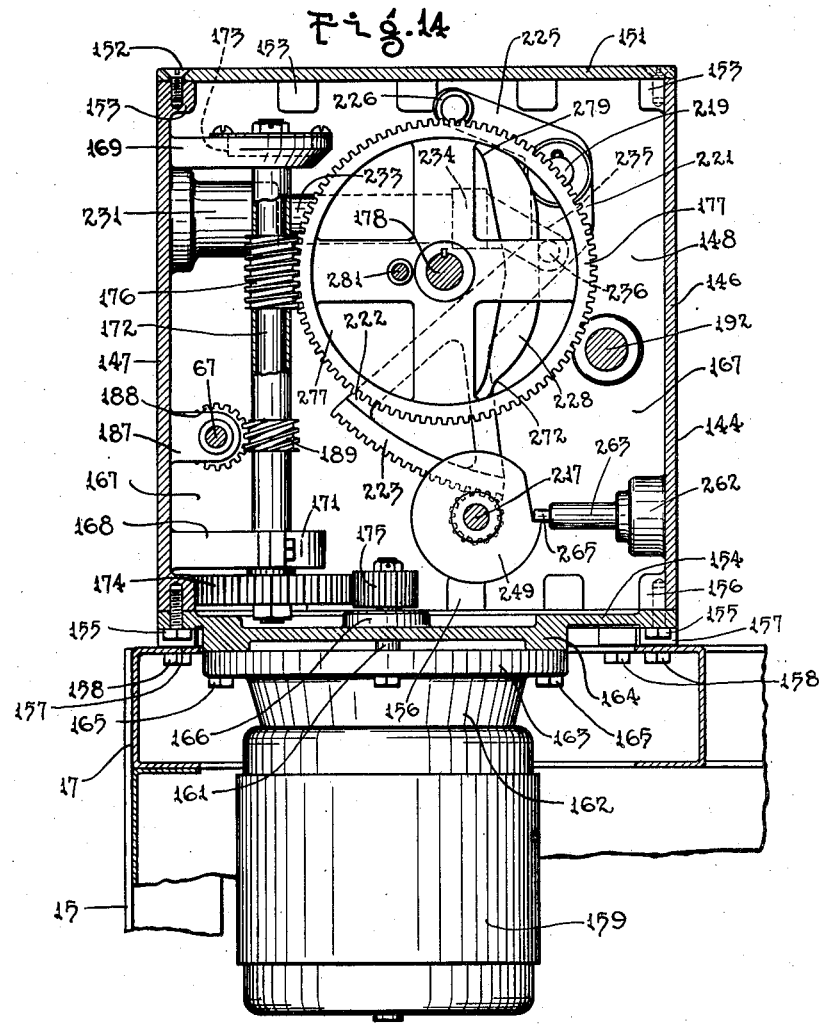
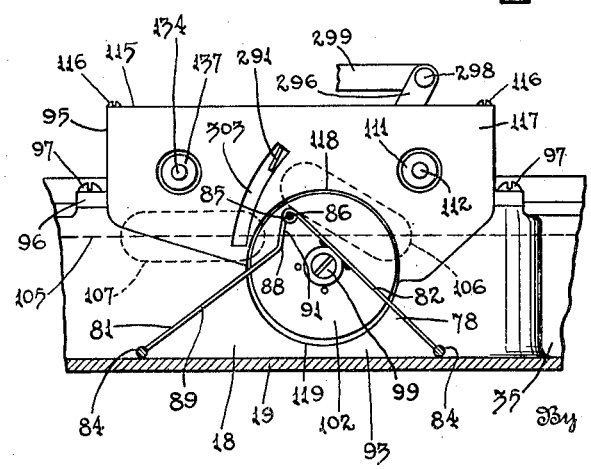
Inventor
Alexander S. T. Lagaard
By Caswell & Lagaard
Attorneys July 9, 1940.  A. S. T. LAGAARD  2,207,591
DOUGHNUT MACHINE
Filed Nov. 6, 1939  7 Sheets-Sheet 4
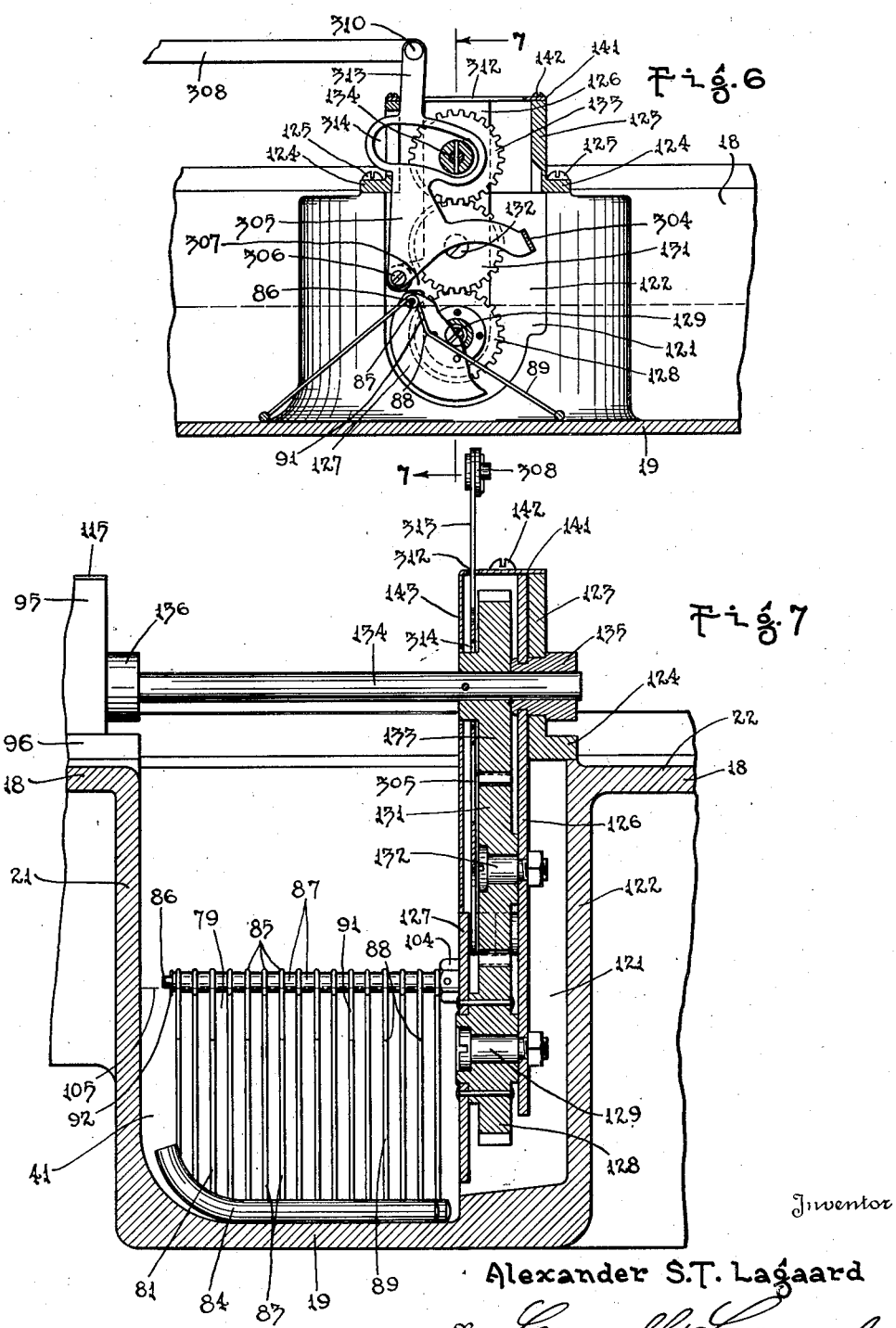
Inventor
Alexander S.T. Lagaard
By Caswell & Lagaard
Attorneys

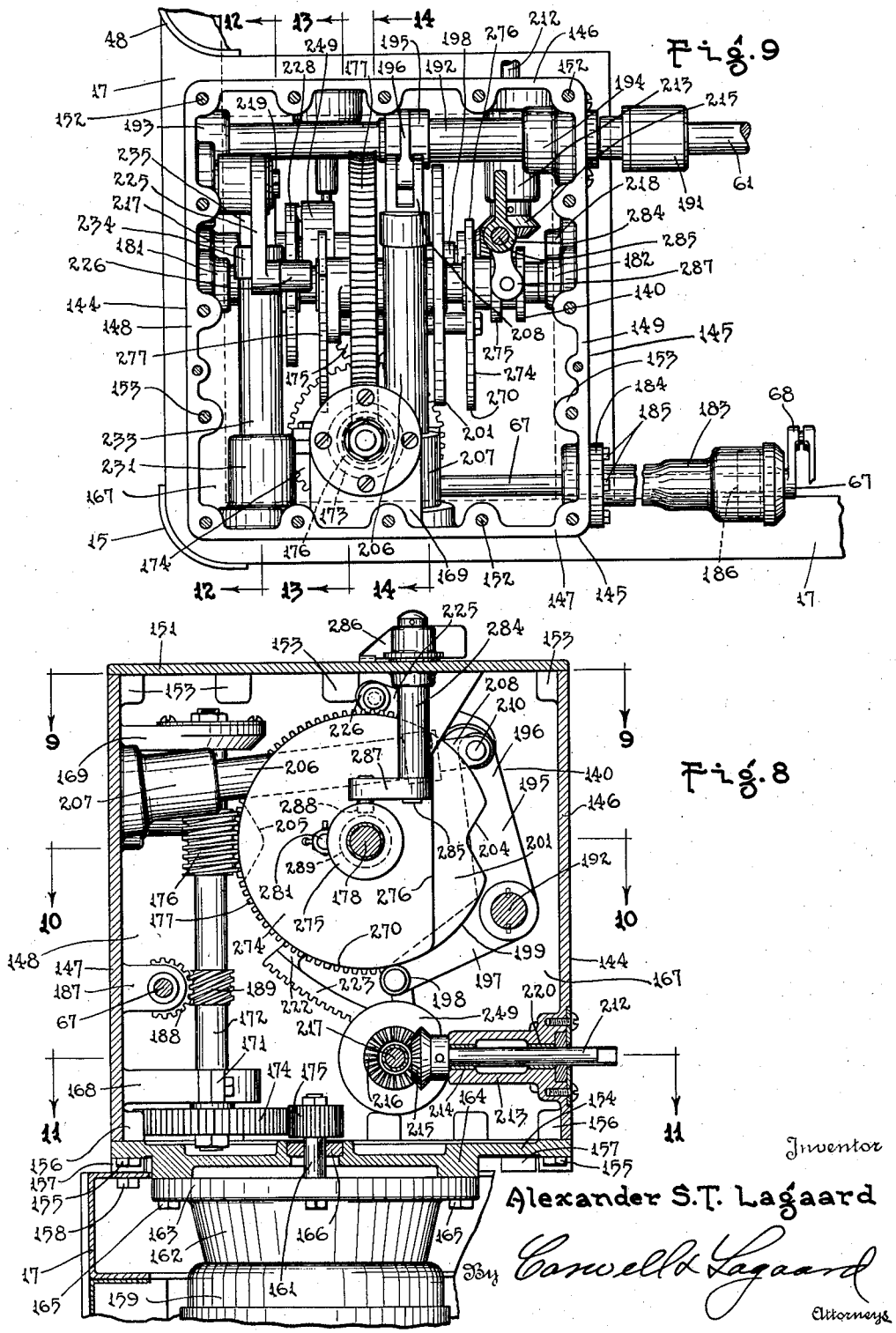

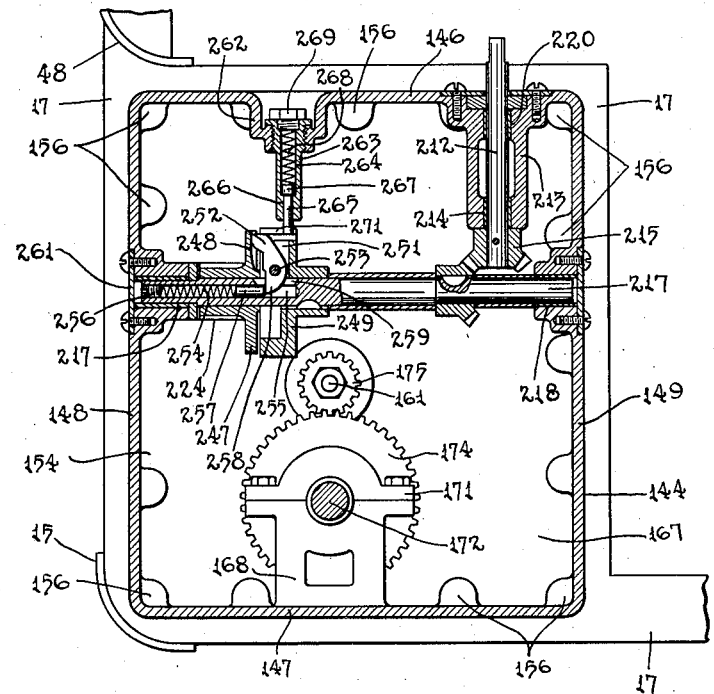
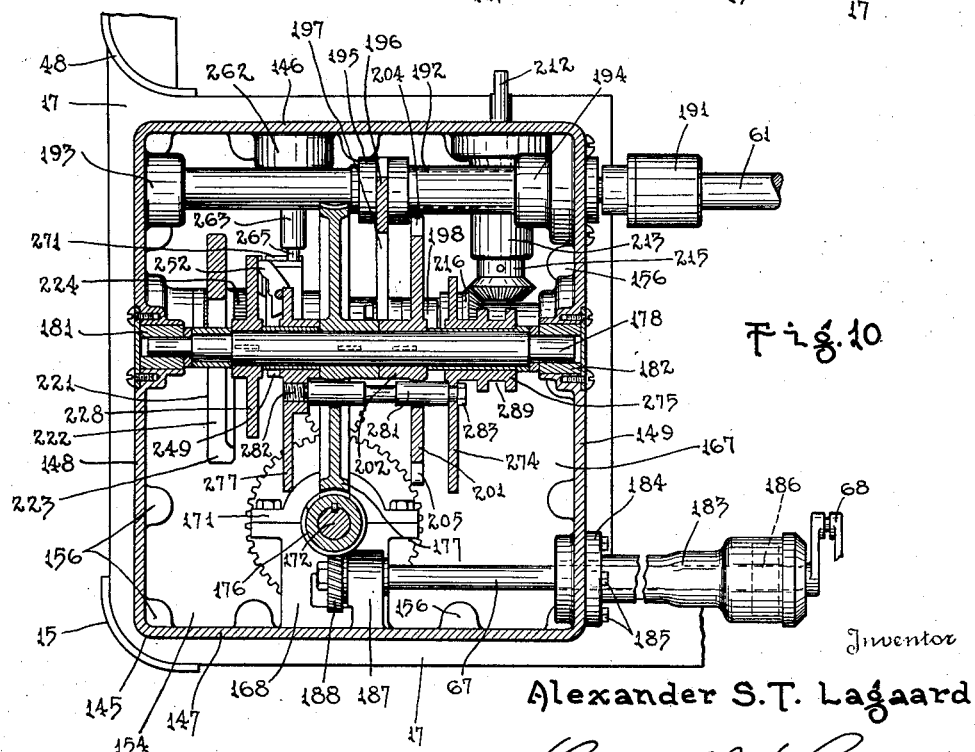

July 9, 1940.  A. S. T. LAGAARD  2,207,591
DOUGHNUT MACHINE
Filed Nov. 6, 1939  7 Sheets-Sheet 7
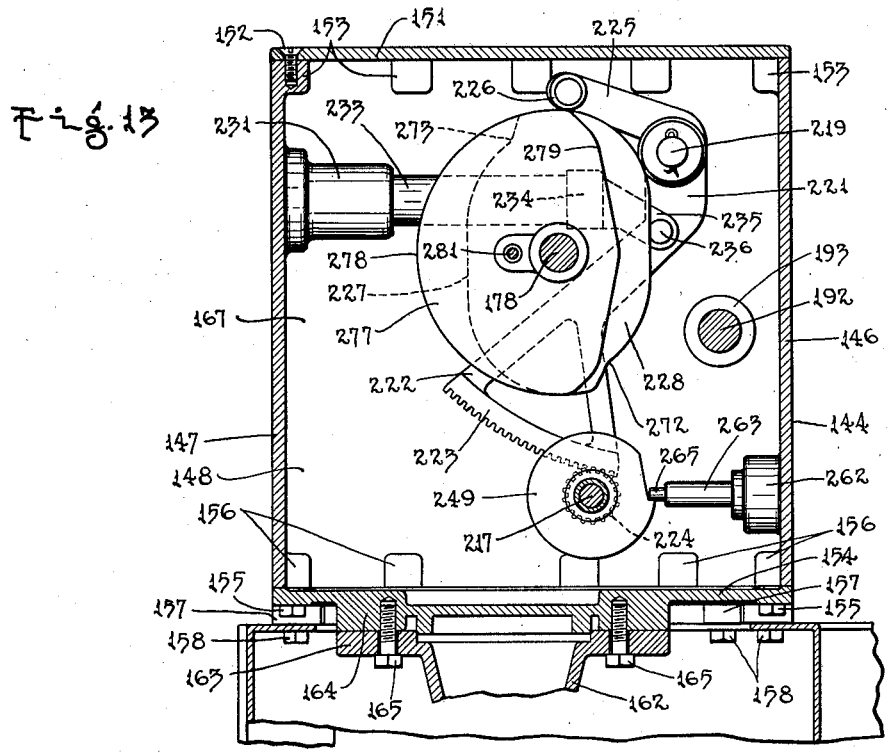
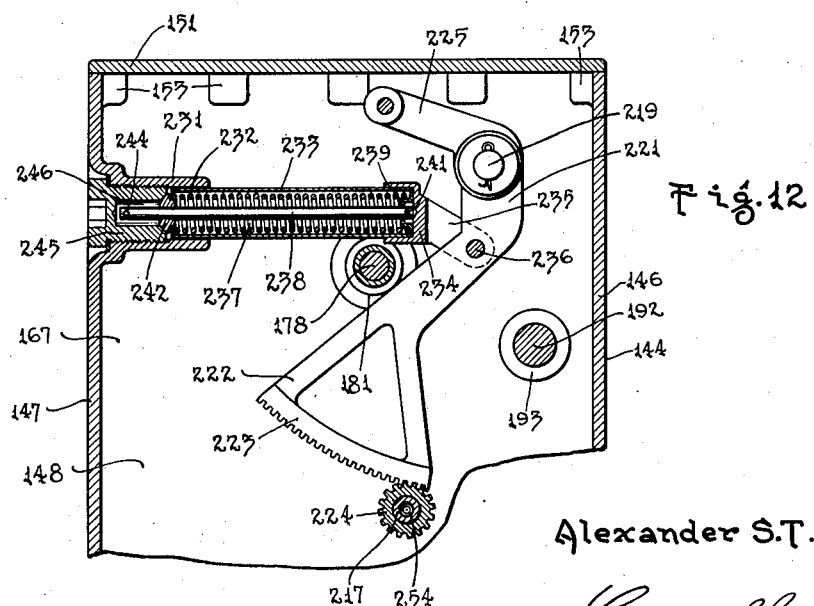
Inventor
Alexander S.T. Lagaard
By Caswell & Lagaard
Attorneys Patented July 9, 1940

2,207,591

UNITED STATES PATENT OFFICE 2,207,591

DOUGHNUT MACHINE

Alexander S. T. Lagaard, Minneapolis, Minn., assignor to Dough-King, Inc., Minneapolis, Minn., a corporation of Minnesota Application November 6, 1939, Serial No. 302,945

14 Claims. (Cl. 53—7)

My invention relates to doughnut machines and has for an object to provide a doughnut machine which will be extremely efficient in operation.

Another object of the invention resides in providing a doughnut machine in which the doughnuts are progressed along a channel by means of the flow of the cooking liquid and in which the number of doughnuts passing through the machine is positively and accurately controlled to control the degree of cooking of the doughnuts.

An object of the invention resides in providing a doughnut machine utilizing a control device for controlling the travel of doughnuts through the doughnut machine, which device includes a grid structure movable from one position in the path of travel of the doughnuts to another and back to its original position to allow the doughnuts to escape one at a time.

Another object of the invention resides in providing an operating mechanism for operating said control device.

A still further object of the invention resides in operating the doughnut former and ejector of the invention from the same operating mechanism.

An object of the invention resides in constructing the operating mechanism so that the capacity of the machine may be manually varied at will.

A feature of the invention resides in the specific construction whereby the capacity of the machine may be varied.

An object of the invention resides in providing the operating mechanism with two pairs of cams, one operating the doughnut former and the other the control mechanism and in varying the capacity of the machine by varying the operation of the cams.

A feature of the invention resides in providing means for simultaneously varying the operation of both of the cams.

Other objects of the invention reside in the novel combination and arrangement of parts and in the details of construction hereinafter illustrated and/or described.

In the drawings:

Fig. 3 is a view similar to Fig. 2 showing the parts in altered position.

Fig. 6 is an elevational sectional view taken on line 6—6 of Fig. 1 and drawn to a greater scale.

Fig. 7 is a cross sectional view taken on line 7—7 of Fig. 6 and drawn to a still greater scale.

Fig. 8 is an elevational sectional view taken on line 8—8 of Fig. 1 and drawn to a greater scale.

Fig. 9 is a plan sectional view taken on line 9—9 of Fig. 8.

Fig. 10 is a plan sectional view taken on line 10—10 of Fig. 8.

Fig. 11 is a plan sectional view taken on line 11—11 of Fig. 8.

Fig. 12 is an elevational sectional view taken on line 12—12 of Fig. 9.

Fig. 13 is an elevational sectional view taken on line 13—13 of Fig. 9.

Fig. 14 is an elevational sectional view taken on line 14—14 of Fig. 9.

Figure 1:
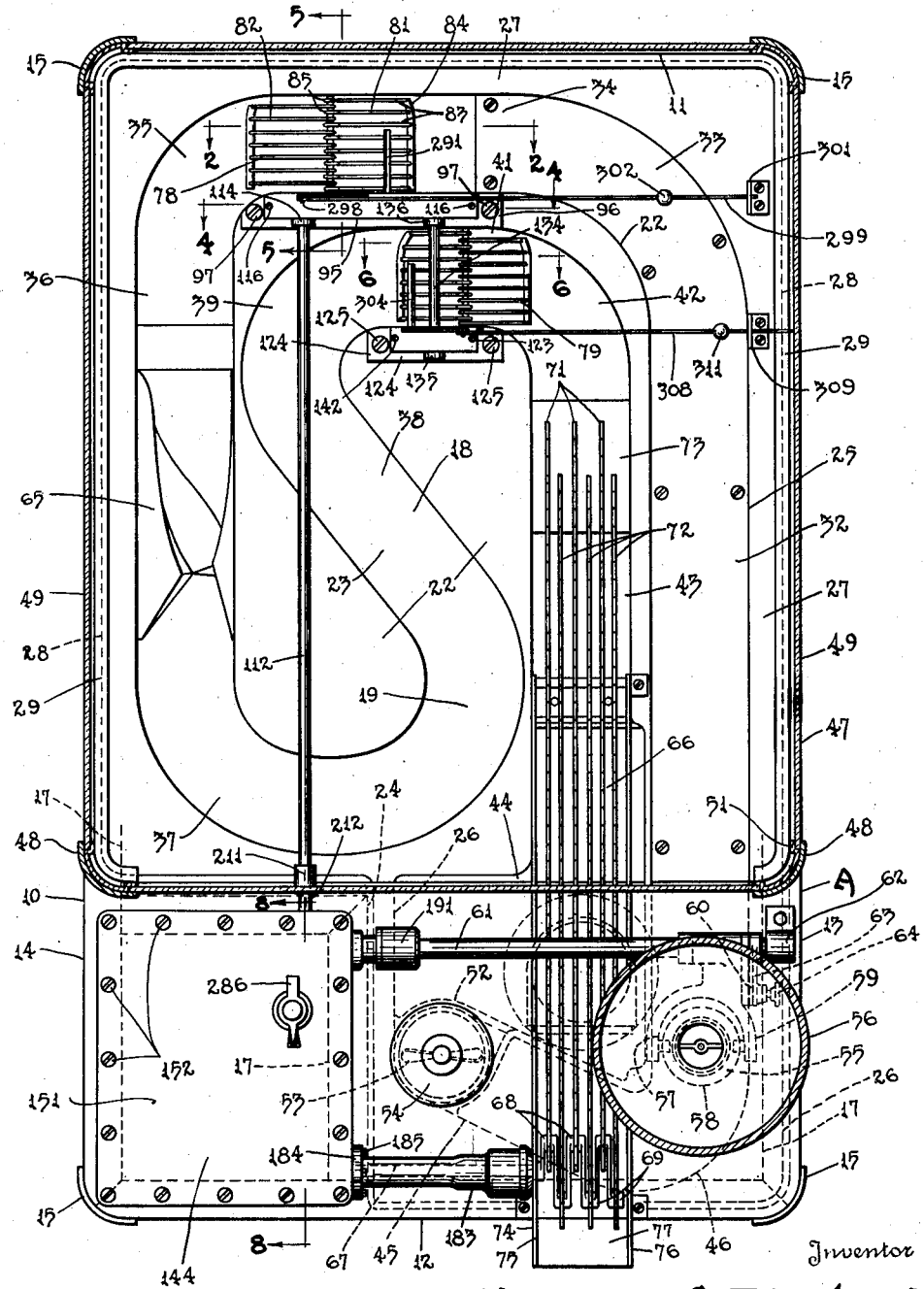
Fig. 1 is a plan view of a doughnut machine illustrating an embodiment of my invention.

In the drawings I have shown a doughnut machine A which consists of a case 10 constructed with end walls 11 and 12 and side walls 13 and 14 connected therewith. The case includes uprights 15 at the corners of the same which extend throughout the height of the case and to which the various walls are attached. The walls are preferably constructed of sheet metal and are directly secured to the uprights 15. The case 10 further includes upper and lower frames 17 which are channel shaped in cross section and which extend perimetrically about the case and hold the various uprights 15 in position. The walls of the case are also attached to these frames.

Within the case 10 is disposed a cooking kettle 18 which is preferably of cast metal and which is constructed with a bottom 19 and with vertical walls 21 extending therefrom. The vertical walls are connected at their upper ends with upper walls 22 and the various walls and bottom are so arranged as to form a channel 23 which extends throughout the major portion of the kettle and which provides a way along which the doughnuts may travel. The kettle 18 has one corner of the same removed, as designated at 24, leaving a main portion 25 of the width of the case 10 and of a length equal to about two-thirds of the length of the same. This construction provides an extension 26 to the kettle which extends up to the end wall 12. The kettle 10 is constructed with a ledge 27 extending about the margin of the same which terminates in a lip 28 projecting upwardly from the extreme edge thereof. A guard 29 on the case 10 issues upwardly from the walls thereof and overlies the lip 28, thereby protecting the same and at the same time being spaced therefrom to retard transmission of heat from the kettle to the case. This guard is attached to the upper frame 17. The kettle 18 is supported on the frame 17 through supporting blocks 31 which are situated at spaced intervals throughout the length of the kettle and which rest directly upon the said frame.

The channel 23 is arranged to provide a straight run 32 which starts in close proximity to wall 12 and follows along wall 13. Channel 23 at the end of run 32 makes a curve 33 which leads into another straight run 34 following along the wall 11. At the end of this run the channel has another curve 35 which leads into still another straight run 36 which follows along the wall 14. At the end of the run 36 the channel is constructed with a loop 37 which is connected to another straight run 38. The run 38 terminates in a curve 39 which, in turn, is connected to a short straight run 41 parallel with the run 34 and closely positioned relative thereto. This run is connected to a curve 42 which, in turn, is connected to a straight run 43 parallel with the run 32 and disposed in close proximity thereto. The run 43 discharges into a reservoir 44 which is merely an enlargement of the said run. From this reservoir a short run 45 is provided which is connected by a curve 46 with the end of the run 32.

The major portion 25, of kettle 18, is enclosed by means of a hood 47. This hood utilizes the uprights 15 at the end wall 11 and two other uprights 48 which are attached to the case 10 at the locality of the end of the major portion 25 of the kettle formed by the corner 24. Between the various uprights are provided glass panels 49 which are slidably supported in guides 51 whereby the said panels may be removed. The hood 47 includes a top by means of which the major portion 25 of kettle 18 is enclosed and which has not been shown in the drawings.

In the reservoir 44 is provided a vertical tubular duct 52 which communicates at its lower end with the bottom of the reservoir 44. In this duct is disposed a propeller or elevator 53 which is mounted on the armature shaft of a motor 54. The duct 52 communicates at its upper end with the run 45 of the channel 23, thus discharging the cooking liquid from the reservoir 44 and into the run 45 of the channel, from which it flows throughout the course of the channel and is returned into the reservoir 44.

Situated at the beginning of the run 32 of channel 23 is a doughnut former 55 which comprises a receptacle 56 for dough and a cutter 57 connected therewith. Such construction being well known in the art will not be described in detail in this application. The cutter 57 includes a flanged sleeve 58 which severs dough extrusions from the mass contained in the receptacle 56. This sleeve is reciprocated in a vertical direction by means of a forked arm 59 which is mounted on a rock shaft 61. Rock shaft 61 is journalled at one end in a bearing 62 and at its other end in a manner to be presently more fully described. The forked arm 59 swings freely on the shaft 61 but may be locked in relation thereto by means of clutch 60 constructed as follows: Rigidly secured to the shaft 61 is an arm 63. This arm has a retractable pin 64 which may engage the forked arm 59 and cause the arm 63 and arm 59 to travel in unison. Air pressure is provided in the upper portion of the receptacle 56 which forces the dough downwardly through the cutter and as the sleeve 58 is reciprocated, annular dough extrusions are deposited in the cooking liquid in the beginning of the run 32 of channel 23.

In the run 36 of channel 23 is arranged a twisted tubular turner 65. This turner inverts the doughnuts after the same have been cooked a predetermined time so that the doughnuts may be cooked equally on both sides. Such construction being well known in the art will not be described in detail in this application. It is to be noted, however, that the turner 65 inclines in the direction of flow of the cooking liquid so that the bottom 19 of the kettle 18 at the run 41 is considerably lower than at the run 34.

In the run 43 of channel 23 is disposed an ejector 66 for removing the cooked doughnuts from the cooking liquid. This ejector comprises a shaft 67 which is constantly driven in a manner to be presently described in detail. This shaft has mounted on it, oppositely extending cranks 68 and 69. Sets of toothed blades 71 and 72 are mounted on the said cranks and are adapted to be alternately raised and lowered and also moved in a longitudinal direction, as the shaft 67 rotates. The lower ends of these blades slide upon an inclined rest 73 which is mounted on the bottom 19 of kettle 18 in the portion of the run 43 leading from the curve 42. It will readily be comprehended that, as the doughnuts reach the said blades the doughnuts are elevated and progressed upwardly and outwardly of the kettle 18. The ejector 66 is disposed within a trough 74 constructed with two side plates 75 and 76 and a bottom 77 connected therewith. The said trough extends outwardly beyond the wall 12 of the case 10 and directs the doughnuts out of the machine.

For controlling the rate of travel of the doughnuts along the channel 23, two control devices 78 and 79 are employed. These control devices operate to allow the doughnuts, one at a time, to enter the turner 65 and the ejector 66, whereby the degree of cooking of the doughnuts on both sides may be controlled.

The control device 78 is shown in detail in Figs. 2, 3, 4 and 5 and consists of two grids 81 and 82 hingedly connected together at their upper ends and slidable along the lower ends along the bottom 19 of the kettle. Both of these grids consist of a number of wire tines 83 which are connected together at their lower ends by means of cross bars 84. The upper ends of these tines are constructed with eyes 85 through which a spindle 86 extends. By means of these eyes the two grids 81 and 82 are pivotally mounted on the spindle 86 and may swing relative to one another. Spacing washers 87 on the spindle 86 between the various eyes 85 of the grids 81 and 82 hold the tines 83 of said grids in proper spaced relation at their upper ends. The grids are held mounted upon the spindle 86 by means of a cotter key 92. The grid 81 is formed with a bend 88 which provides an inclined portion 89 and an upstanding portion 91 connected therewith. The grid 82 inclines throughout its extent.

In the wall structure of the kettle 18, between the runs 34 and 41 thereof, which is indicated by the reference numeral 93, is provided a recess 94. A casting 95 extends across this recess and is provided with a flange 96 projecting outwardly therefrom. This flange has two screws 97 extending through the same which are threaded into the wall structure 93 and support the casting 95 in position. The casting 95 has attached to it a depending plate 98 which projects downwardly into the recess 94. Rigidly secured to the plate 98 is a stud 99 which has rotatably mounted on it a spur gear 101. Spur gear 101 has attached to it on one side thereof a disc 102. The spindle 86 is constructed at one end with a counter-sunk head 103 which is seated within a suitable socket in a disc 102 so that the said spindle projects outwardly from the disc. The said spindle is threaded adjacent the head 103 to receive a nut 104 which holds the spindle in fixed relation relative to said disc. It will thus be seen that the spindle 86 may be moved through an arc of a circle by rotating the disc 102 and during such rotation the bars 84 ride upon the bottom 19 of kettle 18, while the two grids 81 and 82 move in unison forming an obtuse angle when the spindle 86 is at the bottom of its path of movement and forming a more acute angle when in its uppermost positions.

Figure 2:
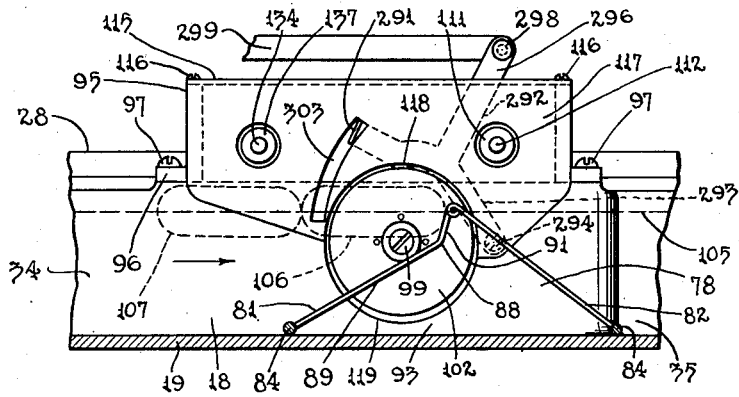
Fig. 2 is a longitudinal sectional elevational view taken along the channel of the machine on line 2—2 of Fig. 1 and drawn to a larger scale.

The normal position of the disc 102 is shown in Fig. 2 where the elevation of the cooking liquid is designated by the line 105. The spindle 86 is positioned in proximity to this elevation so that the doughnuts will engage the upstanding portion 91 of the grid 81 when the doughnuts travel in the direction of the arrow shown in this figure. In Fig. 2 a doughnut indicated in dotted lines at 106 is illustrated as engaging the upstanding portion 91 of grid 81 while the adjacent doughnut, indicated at 107, is urged against the doughnut 106. When the control device 78 is operated the disc 102 moves in a clockwise direction, as viewed in Fig. 2 at a very rapid rate of speed until the eyes 85 of the grids 81 and 82 strike the under side of the doughnut 106 before the same has had an opportunity to travel an appreciable distance. This raises the doughnut up as shown in Fig. 3, and as the control device continues to travel slowly to its normal position the doughnut slides off from the control device and along grid 82 which serves as a skid and the doughnut is thus freed by the control device. As the doughnut 106 leaves the control device 78 doughnut 107 moves up to the place of the doughnut 106 and finally when the control device reaches its normal position the doughnut 107 then occupies the position shown in Fig. 2 for the doughnut 106. Thus as the device operates one doughnut at a time is released.

The mechanism for operating the control device is constructed as follows: Attached to the casting 95 and also to the plate 98 is a stud 108. This stud has rotatably mounted on it a gear 109 which meshes with the gear 101. Gear 109 meshes with another gear 111 which is secured to the end of a shaft 112 by means of a pin 113. Shaft 112 is journalled in a bearing 114 formed on the casting 95 and extends rearwardly of the machine. The various gears carried by the casting 95 are enclosed by means of a cover 115 which is secured to said casting by means of screws 116. The cover 115 has a depending flange 117 which extends along the front of the casting 95 to form a case for enclosing the said gears. This flange is formed with an arcuate cut-away portion 118 at its lowermost edge which receives the disc 102. Similarly the wall structure 93 of the kettle 18 is constructed with a similar cut-away portion 119 which further receives the disc 102. By means of this construction the disc 102 is flush with the inner surface of the wall structure 93 defining the run 34 of channel 23.

Figure 4:
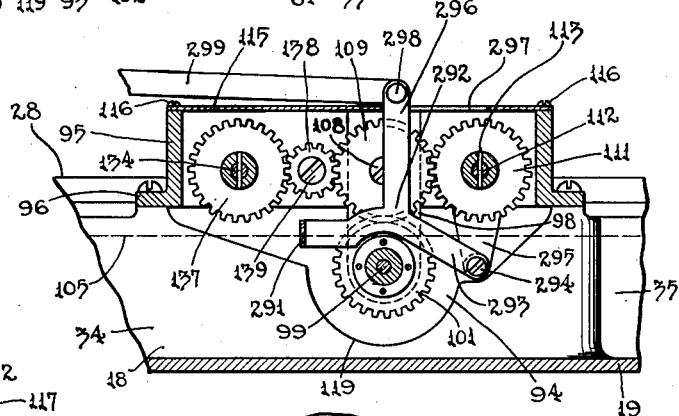
Fig. 4 is a view similar to Fig. 2 taken on line 4—4 of Fig. 1.
Figure 5:
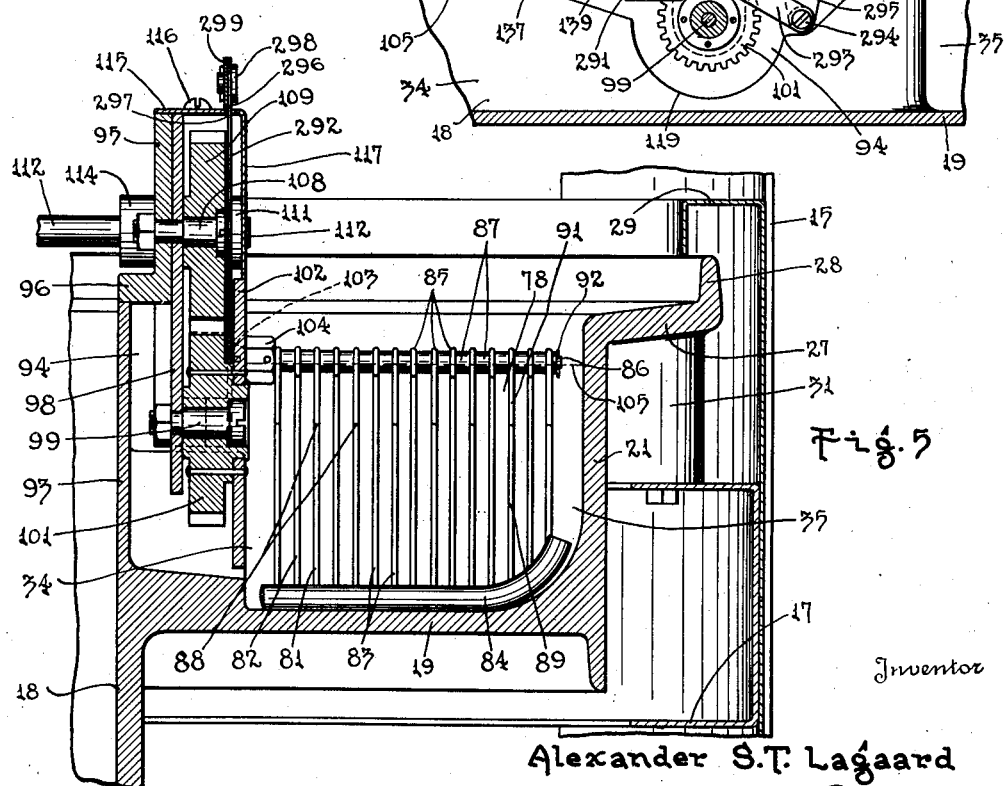
Fig. 5 is a cross sectional view taken on line 5—5 of Fig. 1 and drawn to a still greater scale than Fig. 3.

The control device 79 is constructed similarly to the control device 78 and is operated in the same manner. This construction is shown in Figs. 6 and 7. Due to the similarity of construction the description of the grids and associated part therewith will not be repeated and the same reference numerals will be used to indicate corresponding parts. The operating mechanism for the control device 79 is situated in a recess 121 formed in a wall structure 122 which provides one of the walls of the run 41 of channel 23. Attached to this wall structure is a casting 123 which is formed with a flange 124. Screws 125 passing through the said flange and threaded into the wall structure 122 of the kettle hold the casting 123 in position over the recess 121. The casting 123 has secured to it a plate 126 which depends into the recess 121. The spindle 86 of control device 79 is mounted on a disc 127 which is secured to a spur gear 128. The gear 128 is rotatably mounted on a stud 129 which is attached to the lower end of the plate 126. Spur gear 128 meshes with another spur gear 131 rotatably mounted on a stud 132 which is also secured to the plate 126. The spur gear 131 in turn meshes with another spur gear 133 which is fast on a shaft 134. Shaft 134 is journalled at one end in a bearing 135 attached to the casting 123. This shaft extends across the run 41 of channel 23 and through the casting 95 of the control device 78 and into the case formed by the said casting and the cover 115. Shaft 134 is further journalled in a bearing 136 formed on the casting 95 as shown in Fig. 7. The end of the shaft 134, disposed within the said case, has secured to it a spur gear 137 (Fig. 4). This spur gear meshes with an idler gear 138 rotatably mounted on a stud 139 secured to casting 95. The idler gear 138 in turn meshes with the gear 109, which, when shaft 112 is rotated serves to rotate the gear 128 and operate the control device 79. Due to the use of the idler gear 138 the control device 79 operates in reverse manner with reference to control device 78 to control the travel of the doughnuts in the run 41 in which the doughnuts travel in a reverse direction as compared to the doughnuts in run 34. The casting 123 has attached to it a cover plate 141 by means of screws 142, which cover plate has a flange 143 extending downwardly along the exposed surface of the wall structure 122 and covering the gears 131 and 133. This flange is constructed in much the same manner as the flange 117 of cover 115 and operates in the same manner.

The control device 78 is continuously operated by the transmission mechanism 140. In order to procure sufficient cooking time for the doughnuts in advance of each of the said control devices when the machine is first started, it becomes necessary to prevent travel of the doughnuts until the desired number of doughnuts are in the machine. In conjunction with the control device 78 an obstructing member 291 is employed which is adapted to be moved in the path of the movement of the doughnuts and to obstruct travel of the same. This member is in the nature of a blade which is attached to a lever 292 disposed within the recess 94. Lever 292 has an arm 293 which is pivoted by means of a stud 294 to a depending lug 295 formed on the casting 95. The said lever has another arm 296 which passes upwardly through a slot 297 in the cover 115. This arm has pivotally connected to it, by means of a rivet 298, a link 299. Link 299 extends transversely of the machine and is supported in a guide 301 attached to the ledge 27 of the kettle 18. A knob 302 on the said link serves to move the link and swing the obstructing member 291 when the link is reciprocated. The obstructing member 291 extends through a slot 303 in the flange 117 of cover 115. When the obstructing member 291 is in the position shown in Fig. 4 the doughnuts striking the same are arrested and the control device 78 fails to allow the doughnuts to pass. When the device is in the position shown in Fig. 2, the doughnuts are controlled by the control device in the customary manner.

In conjunction with the control device 79 an obstructing member 304 is employed which is similar to the obstructing member 291. This member is formed on a lever 305 which is pivoted through a screw 306 to a lug 307 extending outwardly from the plate 126. A link 308 is connected by means of a rivet 310 with an upwardly extending arm 313 forming part of the lever 305. Said arm passes through a slot 312 in the cover 141. Obstructing member 304 similarly passes through a slot in the flange 143 similar to the slot 303 but not shown in the drawings. Lever 305 is constructed with an arcuate slot 314 through which shaft 134 extends and which permits of swinging said lever to move the obstructing member 304 from one position to another. Link 308 is guided for sliding movement in a guide 309 secured to the ledge 27 of kettle 18 and is provided with a knob 311 by means of which the same may be moved.

The cutter 55, the ejector 66, and the two control devices 78 and 79 are all operated by an operating mechanism 140 contained within a chamber 167 formed within a case 144, disposed in the cut-away corner 24 of the kettle 18. This operating mechanism will now be described in detail.

The case 144 includes a lateral wall structure indicated in its entirety by the reference numeral 145 which is open at the top and bottom. This wall structure includes two side walls 146 and 147 and two end walls 148 and 149. These walls are covered at the top by a cover 151 which is secured to said walls by means of counter-sunk screws 152 threaded into bosses 153 formed on said walls. In a similar manner a closure 154 is provided for the lowermost portion of the case 144, which closure is attached to the wall structure 145 by means of screws 155 which are similarly threaded into bosses 156 formed on the wall structure 145. The case 144 is provided with pads 157 formed on the closure 154, which pads rest upon the upper frame 17 and are secured thereto by means of screws 158 which pass through the uppermost flanges of frame members of frame 17 and are threaded into said pads.

The closure 154 of case 144 has attached to the underside thereof an electric motor 159 having a vertical shaft 161. Motor 159 is constructed with an end bell 162 provided with a flange 163 adapted to engage a ring 164 cast on the under surface of the closure 154. Screws 165 extending through the flange 163 are threaded into the ring 164 and hold the motor 159 attached to the closure 154. Motor 159 may be of any desirable construction and the details thereof have not been shown in the drawings. The shaft 161 of motor 159 passes through a seal 166 and into the chamber 167 formed within the case 144.

Issuing from the wall 147 of case 144 are two bearing supports 168 and 169. The bearing support 168 has attached to it a bearing 171 for the lower end of a vertically extending shaft 172. This shaft is journalled in its upper end in a ball bearing 173 which serves as an end thrust bearing for restraining longitudinal movement with the shaft 172. Shaft 172 has secured to the lower end thereof a spur gear 174 which meshes with a pinion 175 fast on the shaft 161 of motor 159. Shaft 172 also has formed on it a worm 176 which meshes with a worm wheel 177 keyed to a horizontally extending shaft 178. Shaft 178 extends completely across the case and is journalled in bearings 181 and 182 formed on the end walls 148 and 149.

The ejector 66 is driven from the shaft 172 in the following manner: Shaft 67 of the said ejector extends through a tubular housing 183 provided with a flange 184 at one end. This flange is secured to the wall 149 of case 144 by means of screws 185. The housing 183 is provided at its outer end with a bearing 186 which journals one end of the shaft 67. The other end of this shaft extends into the chamber 167 of case 144 and is journalled in a bearing 187 issuing outwardly from the wall 147 of case 144. The shaft 67 has mounted on it a spiral gear 188 which meshes with another spiral gear 189 fast on the shaft 172. These gears are so proportioned that the shaft 67 travels at a suitable speed to alternately raise the toothed blades 71 and 72 and procure ejection of the doughnuts.

The mechanism for operating the control devices 78 and 79 will now be described in detail. Shaft 112 extends along the upper portion of the kettle 18 toward the operating mechanism 140 contained within the casing 144 and is connected by means of a coupling 211 with a shaft 212. Shaft 212, as best shown in Fig. 8, extends through the wall 146 of case 144 and into the chamber 167 of the said case at an elevation near the closure 154 thereof. Within the chamber 167 of the case 144 is formed an elongated boss 213 which is provided with bearings 214 and 220 journalling the shaft 212. This shaft has secured to the end of it a bevel gear 215 which meshes with another bevel gear 216 fast on a shaft 217 extending horizontally across the case 144. The latter shaft is journalled in bearings 217 and 218 carried by the side walls 148 and 149 of the case 144 and shown in Fig. 11.

Attached to the wall 148 of case 144, near the uppermost portion of the same, as best shown in Fig. 13, is a stud 219. Mounted for oscillation on this stud is a lever 221 which has a depending arm 222. Arm 222 is formed with a gear segment 223 which meshes with a pinion 224 rotatably mounted on the shaft 217. The lever 221 is further formed with an arm 225 which carries at the end of it a roller 226 adapted to engage the surface 227 of a disc cam 228. Cam 228 is keyed to the shaft 178, as best shown in Fig. 10.

The lever 221 is urged to move in a counter-clockwise direction, as viewed in Fig. 13, to cause the roller 226 to bear against the cam 228 by means of the following construction: This construction is best shown in Fig. 12. Issuing inwardly from the wall 147 of case 144 is a boss 231 which is bored at 232 to slidably receive a tube 233. Tube 233 has connected to the end of it a socketed head 234 which has secured to it a forked arm 235. Arm 235 is pivoted by means of a pintle 236 to the arm 222 of lever 221. Within the interior of the tube 233 is mounted a compression coil spring 237 which encircles a rod 238. Rod 238 is also encircled at one end by means of a disc 239 held in place by a cotter key 241. This rod has slidably mounted on its other end a disc 242 which is conical in form and which is held in place on said rod through a cotter pin 244. A plug 245 is screwed into the boss 223 and engages the disc 242 in a manner to compress the spring 237. This plug is provided with a socket 246 into which the end of the rod 238 projects when the spring is compressed. It will be readily comprehended that the spring 238 urges the roller 226 to follow the surface 227 of cam 228. In the event that the spring 237 should break, plug 245 may be removed from the exterior of the device and the spring assembly consisting of the rod 238 and spring 237 and the two discs 239 and 242 may be removed from the tube 233, as a unit. A new unit may then be inserted and the plug 245 screwed into the boss to initially compress the spring an amount sufficient to procure operation of the device.

The construction for procuring operation of the shaft 212 which operates the two control devices 78 and 79 of the invention is best shown in Fig. 11. The gear 224, which was previously referred to, has issuing outwardly from it a flange 247. This flange is constructed with a ratchet notch 248 in the face thereof. Adjacent to the flange 247, on shaft 217, is a head 249 which is keyed to the said shaft and which is constructed with a groove 251 in the same extending in a radial direction. In this groove is disposed a pawl 252 which is pivoted on a pin 253 extending through the head 249. The pawl 252 is adapted to engage the notch 248 in flange 247, and when the gear 224 is rotated in one direction, the head 249 and the shaft 217 are both rotated in the same direction. This causes rotation of shaft 212 and shaft 112 through the bevel gears 215 and 216 which operates the control devices 78 and 29.

The pawl 252 is yieldingly held in engagement with the notch 248 by means of a compression coil spring 254 which is disposed in a bore 255 in the end of the shaft 217. This spring is seated against a plug 256, threaded in the end of the said shaft and engages a sliding plunger 257 in the bore 255 which bears against a finger 258 formed on the pawl 252, which finger extends through a slot 259 in the shaft 217 and into the bore 255. In this manner the pawl is held in engagement with the ratchet notch 248. By unloosening the plug 256, which is accessible through a removable cap 261, on the exterior of the wall 148 of case 144, spring 254 may be replaced when the occasion requires it.

The two control devices 78 and 79 operate only in one direction. To prevent reverse movement of these devices the head 249 is held from rotation when the gear 224 travels in the reverse direction. This is accomplished as follows: Formed on the interior of the wall 146 of case 144 is a threaded boss 262. This boss has screwed into it a tubular guide 263 formed with a bore 264. A plunger 265 is slidable in another bore 266 forming a continuation of the bore 264 and of reduced diameter. This plunger is constructed with a head 267 disposed within the bore 264. A compression coil spring 268 in the bore 264 engages the head 267 and urges the plunger 265 outwardly. The spring 268 reacts against a plug 269 screwed in the end of the tubular guide 263. The plunger 265 serves as a dog and is adapted to engage in a ratchet notch 271 formed in the outer periphery of the head 249. The two notches 271 and 248 are so arranged that rotation of the gear 224 in opposite directions causes rotation of the shaft 212 in one direction only.

For rocking the shaft 61 which operates the cutter 55, the following construction is used. Shaft 61 is connected by means of a coupling 191 with another shaft 192 extending across the walls 148 and 149 of case 144. This latter shaft is journalled in bearings 193 and 194 formed on the walls 148 and 149 of the case. The shaft 192 has keyed to it a bell crank 195 which has an upwardly extending arm 196 and a substantially horizontally extending arm 197. The arm 197 of bell crank 195 has rotatably mounted at the end thereof a roller 198 which is adapted to engage the periphery 199 of a disc cam 201. Cam 201 is constructed with a hub 202 Fig. 10, which is keyed to the shaft 178. The surface 199 of cam 201 is formed with two indentations 204 and 205 diametrally opposed which, when the roller 198 drops into the same, permit the bell crank 195 to oscillate, whereby the cutter sleeve 58 is raised and lowered to procure the deposit of dough formations into the cooking liquid in the kettle 18. The roller 198 is urged into engagement with the surface 199 of cam 201 by means of a spring similar to that described in connection with the mechanism for operating the control device. This spring is contained within a tubular housing 206 slidable in a boss 207 issuing from the wall 147 of case 144. The said spring acts against a plunger 208 which is pivoted to the end of the arm 196 of bell crank 195 by means of a pin 210 and urges the same to cause a clockwise movement of shaft 192, as viewed in Fig. 8.

It will be noted that the cam 201, which operates the cutter 55, has two depressions 204 and 205 in it, whereby two doughnuts are cut for each revolution of the shaft 178. Likewise, the cam 228 which operates the control devices 78 and 79 has two depressions 272 and 273 in it by means of which the control devices are operated twice for each revolution of the shaft 178. By means of the construction now to be described operation of the cutter and control devices may be procured through one only of the depressions of the two cams referred to. Operating in conjunction with the cam 201 is an auxiliary cam 274 which is attached to a hub 275 slidable on the shaft 178. This auxiliary cam is best shown in Fig. 8 and has a portion 270 of the same diameter as the major diameter of the cam 201. Cam 274 is, however, cut away as indicated at 276 at a locality directly opposite the depression 204 in cam 201. The roller 198 is of a length equal to the combined thickness of both of the cams 201 and 274. Cam 274 may be slid up against the cam 201 and when juxtaposed with reference thereto the roller 198 engages both the said cams. In such position the portion 270 of cam 274 prevents the roller from dropping into the depression 205. It will thus be seen that only the depression 204 is available to operate the cutter 55 and only one doughnut per revolution of shaft 178 is formed. When, however, the cam 274 is moved away from the cam 201, as shown in Fig. 10, roller 198 only engages the cam 201 and then drops into both of the depressions 204 and 205 and causes the cutter 55 to cut two doughnuts per revolution of shaft 178.

In conjunction with the cam 228 an auxiliary cam 277 is employed which is best shown in Fig. 13. This cam is also slidably mounted on the shaft 178. Cam 277 has a portion 278 of a diameter equal to the major diameter of the cam 228, which portion is adapted to completely overlie the depression 273 in the cam 228. Cam 277 is cut away, as designated at 279, to expose the depression 272 of cam 228. The roller 226, similar to the roller 198, is of sufficient length to engage both of the cams 228 and 277 when the cam 277 is moved in close proximity to the cam 228. When the cam 277 is moved away from the cam 228, the roller 226 engages the cam 228 only. It will thus be seen that the control devices 78 and 79 function once only for each revolution of the shaft 178 when the cam 277 is in juxtaposition with reference to the cam 228 and that said control devices function twice per revolution of shaft 178 when the cam 277 is disposed in spaced relation to the cam 228.

The two cams 277 and 274 are simultaneously moved longitudinally of the shaft 178 to cause the said cams to be brought in proximity with the two cams 228 and 201 by means of the following construction shown in Fig. 10. Extending through the gear 177 and through the cam 201 is a rod 281. This rod has a threaded end 282 which is screwed into the cam 277. A screw 283 passes through the cam 274 and is threaded into the rod 281. By means of this screw the rod 281 is also connected to the cam 274. It will thus be seen that the two cams move in unison. The rod 281, in addition, serves as a key for preventing rotation of the said two cams. Extending downwardly from the cover 151 is a boss 284 which is drilled to form a bearing for a shaft 285 best shown in Fig. 8. Shaft 285 extends outwardly beyond the cover and has secured to it a finger piece 286 by means of which the said shaft may be rotated. Shaft 285 also extends below the boss 284 and has secured to its lower end an arm 287. This arm has attached to the end of it a pin 288 which engages within a groove 289 in the hub 275. When the shaft 285 is rotated, through engagement with the finger piece 286 pin 288 shifts the hub 275 along the shaft 178. This moves both cams 274 and 277, as previously described.

The operation of the invention is as follows: The channel 23 in kettle 18 is first filled with cooking liquid. This liquid is maintained at a suitable temperature for cooking by means of a heater disposed beneath said kettle and which has not been shown in the drawings. The motor 54 is then started which causes operation of the propeller 53. Circulation of the cooking liquid in the channel 23 now commences. The motor 159 is now energized and the shaft 178 of the transmission mechanism set in operation. This procures operation of the ejector 66 and the two control devices 78 and 79. In addition, the shaft 61 is periodically oscillated. The clutch 60 is, however, maintained open so that the cutter 55 is normally inoperative. The container 56 is filled with dough and air pressure applied to the same. As soon as the clutch 60 is closed the cutter 55 operates and dough extrusions are deposited in the flowing cooking liquid within the channel 23. The obstructing members 304 and 291 are moved into obstructing positions by means of the knobs 311 and 302. As the doughnuts travel along the the runs 32 and 33 of the channel 23 member 291 arrests the movement thereof and the said member is maintained in obstructing position until the required number of doughnuts have accumulated in advance of the same. Thereafter the said obstructing member 291 is elevated and the doughnuts now travel through the control device 78 and are released, one at a time, to the turner 65. The doughnuts passing through the said turner are now arrested by means of the obstructing member 304 and the same stack up in advance of the control device 79. When a sufficient number of doughnuts have accumulated in advance of the obstructing member 304 the same is elevated by knob 311 and the machine then continues to operate in its normal manner. As the doughnuts are released one at a time by the control device 79 the same pass up the ejector 66 and are discharged from the machine. When it becomes desirable to change the capacity of the machine the same may be readily accomplished by shifting the finger piece 286. This varies the positions of the two auxiliary cams 274 and 277 so that either the maximum number or one-half as many doughnuts may be cooked in a unit of time.

The advantages of my invention are manifest. My improved doughnut machine is extremely positive in action and perfectly formed doughnuts may be made by the machine. With my improved control devices irregular shaped doughnuts will readily pass through the machine and clogging of the same is thus entirely prevented. By means of the operating mechanism for the various parts of the machine most of the elements of the operating mechanism and other devices associated therewith are contained within a single case where the same may be run in oil, thus requiring a minimum amount of attention. The operating mechanism and motor are disposed exteriorly of the kettle so that the same are out of heat conducting relation therewith and may operate at a suitable temperature considerably lower than that of the kettle. The operating mechanism is readily accessible and may be removed as a unit whenever the occasion requires. With my invention the springs used in conjunction with the cams may in the event of breakage be removed from the case without dismantling the mechanism and without opening up the case.

Changes in the specific form of my invention, as herein disclosed, may be made within the scope of what is claimed without departing from the spirit of my invention.

Having described my invention, what I claim as new and desire to protect by Letters Patent is:

1. In a doughnut machine in which the doughnuts are progressed along a way by means of the flow of the cooking liquid, a doughnut former for depositing dough formations in the cooking liquid, a turner, control means for controlling the number of doughnuts passing through the turner, a drive shaft, a cam on said shaft, said cam having a plurality of irregularities, means controlled by said cam for operating said control means, said cam causing one operation of said control means for each irregularity, a second cam on said shaft, said second cam having a plurality of irregularities correspnding in number to those of the first cam, means controlled by said second cam for operating said doughnut former, said second cam causing one operation of said doughnut former for each irregularity thereof, auxiliary cams on said shaft movable axially thereof to cover or uncover certain of the regularities of said first and second named cams to vary the number of operations of the control means and doughnut former, and means for simultaneously moving both of said auxiliary cams to procure a corresponding number of operations of each of said first and second named cams 2. In a doughnut machine in which the doughnuts are progressed along a way, a doughnut former for depositing dough formations in the cooking liquid in the way, a drive shaft, a cam on said shaft, said cam having a plurality of irregularities, means controlled by said cam for operating said doughnut former, said cam causing one operation of said doughnut former for each irregularity, an auxiliary cam, means for guiding said auxiliary cam for movement from a position covering certain of said irregularities to a position uncovering the same, to vary the number of operations of the doughnut former, and means for moving said cam from one position to the other.

3. In a doughnut machine in which the doughnuts are progressed along a way, a doughnut former for depositing dough formations in the cooking liquid in the way, a drive shaft, a cam on said shaft, said cam having a plurality of irregularities, a cam follower adapted to engage said cam and follow along the irregularities thereof, means controlled by said cam follower for operating said doughnut former, said follower causing one operation of said doughnut former for each irregularity of the cam, an auxiliary cam, means for guiding said auxiliary cam for movement from a position engageable by said follower to a position free therefrom, said auxiliary cam when in its position to be engaged by the follower, restraining movement of said follower along certain of said irregularities of the cam to vary the number of operations of the doughnut former, and means for moving said cam from one position to the other.

4. In a doughnut machine in which the doughnuts are progressed along a way, a doughnut former for depositing dough formations in the cooking liquid in the way, a drive shaft, a cam on said shaft, said cam having a plurality of indentations therein, means controlled by said cam for operating said doughnut former, said cam causing one operation of said doughnut former for each indentation, an auxiliary cam, means for guiding said auxiliary cam for movement from a position covering certain of said indentations to a position uncovering the same to vary the number of operations of the doughnut former, and means for moving said cam from one position to the other.

5. In a doughnut machine in which the doughnuts are progressed along a way, a doughnut former for depositing dough formations in the cooking liquid in the way, a turner for inverting the doughnuts in the way, control means for controlling the number of doughnuts passing through the turner, a shaft, means for driving said shaft, a cam on said shaft, said cam having a plurality of irregularities, means controlled by said cam for operating said control means, said cam causing one operation of said control means for each irregularity, an auxiliary cam, means for guiding said auxiliary cam for movement from a position covering certain of said irregularities to a position uncovering the same to vary the number of operations of the control means, and means for moving said cam from one position to the other.

6. In a doughnut machine in which the doughnuts are progressed along a way, a doughnut former for depositing dough formations in the cooking liquid in the way, a drive shaft, a cam on said shaft, said cam having a plurality of indentations therein, a follower adapted to engage the surface of said cam and to follow the indentations, means controlled by said follower for operating said doughnut former, said cam causing one operation of said doughnut former for each indentation, an auxiliary cam disposed adjacent said first named cam, means for guiding said auxiliary cam for movement axially of said shaft from a position adjacent said first named cam in which said auxiliary cam is adapted to engage said follower to a position spaced from said first named cam in which position the auxiliary cam is free from said follower, said auxiliary cam when in its first named position covering certain of said indentations and restraining the follower from following along said indentations, and means for moving said cam from one position to the other.

7. In a doughnut machine in which the doughnuts are progressed along a way, a doughnut former for depositing dough formations in the cooking liquid in the way, a turner, control means for controlling the number of doughnuts passing through the turner, a shaft, means for driving said shaft, a cam on said shaft, said cam having a plurality of indentations, a follower adapted to engage the surface of said cam and to follow the indentations, means controlled by said follower for operating said control means, said cam causing one operation of said control means for each indentation, an auxiliary cam disposed adjacent said first named cam, means for guiding said auxiliary cam for movement axially of said shaft from a position adjacent said first named cam in which said auxiliary cam is adapted to engage said follower to a position spaced from said first named cam in which position the auxiliary cam is free from said follower, said auxiliary cam when in its first named position covering certain of said indentations and restraining the follower from following along said indentations, and means for moving said cam from one position to the other.

8. In a doughnut machine in which the doughnuts are progressed along a way by means of the flow of the cooking liquid, a doughnut former for depositing dough formations in the cooking liquid, a turner, control means for controlling the number of doughnuts passing through the turner, said control means including an engaging member movable periodically from one position in the way to another to release the doughnuts one at a time to the turner, a shaft for operating said control means, a drive shaft, a cam on said drive shaft, a lever having a cam follower adapted to engage said cam, a gear segment operated by said lever, a gear driven by said gear segment, and a ratchet mechanism between said gear and first named shaft for driving said first named shaft in one direction.

9. In a doughnut machine in which the doughnuts are progressed along a way by means of the flow of the cooking liquid, a doughnut former for depositing dough formations in the cooking liquid, a turner, control means for controlling the number of doughnuts passing through the turner, said control means including an engaging member movable periodically from one position in the way to another to release the doughnuts one at a time to the turner, a shaft for operating said control means, a drive shaft, a cam on said drive shaft, a lever having a cam follower adapted to engage said cam, a gear segment operated by said lever, a gear driven by said gear segment and rotatable about the axis of said first named shaft, and a ratchet mechanism between said first named shaft and gear for driving said first named shaft in one direction.

10. In a doughnut machine in which the doughnuts are progressed along a way by means of the flow of the cooking liquid, a doughnut former for depositing dough formations in the cooking liquid, a turner, control means for controlling the number of doughnuts passing through the turner, said control means including an engaging member movable periodically from one position in the way to another to release the doughnuts one at a time to the turner, a shaft for operating said control means, a drive shaft, a cam on said drive shaft, a movable member having a cam follower for engagement with said cam, gear teeth on said movable member, a gear operated by said gear teeth, and a ratchet mechanism between said gear and first named shaft for driving said first named shaft in one direction.

11. In a doughnut machine in which the doughnuts are progressed along a way by means of the flow of the cooking liquid, a doughnut former for depositing dough formations in the cooking liquid, a turner, control means for controlling the number of doughnuts passing through the turner, said control means including an engaging member movable periodically from one position in the way to another to release the doughnuts one at a time to the turner, a shaft for operating said control means, a drive shaft, a cam on said drive shaft, said cam having a plurality of indentations therein, a movable member having a cam follower for engagement with said indentations, gear teeth on said movable member, a gear driven by said gear teeth, a ratchet mechanism between said gear and first named shaft for driving said shaft in one direction, an auxiliary cam disposed adjacent said first named cam and movable axially of said drive shaft to a position covering certain of said indentations to a position uncovering the same, said auxiliary cam when in the first position engaging said follower and restraining movement of said follower along said indentation, said auxiliary cam when uncovering said indentation allowing the follower to follow along said indentation, and means for moving said auxiliary cam from one position to the other.

12. A control device for doughnut machines in which the doughnuts are progressed along a way by means of the flow of the cooking liquid, said control device including a revoluble member having its axis disposed transversely of the way at an elevation below the surface of the cooking liquid, a spindle projecting laterally from said revoluble member eccentrically of the axis thereof and a pair of grids having one end of each thereof pivoted to the spindle and the other ends extending downwardly to the bottom of the way and resting thereon, and means for periodically rotating said shaft through a complete revolution in one direction only.

13. A control device for doughnut machines in which the doughnuts are progressed along a way by means of the flow of the cooking liquid, said control device including a revoluble member having its axis disposed transversely of the way at an elevation below the surface of the cooking liquid, a spindle projecting laterally from said revoluble member eccentrically of the axis thereof and a pair of grids having one end of each thereof pivoted to the spindle and the other ends extending downwardly to the bottom of the way and resting thereon, one of said grids when the revoluble member is in one position obstructing the travel of doughnuts along the way, and means for rotating said revoluble member periodically to cause said grids to pass beneath a doughnut and in advance of the preceding doughnut and back to normal position before the succeeding doughnut has reached the original position of the doughnut engaged by the control device.

14. A control device for doughnut machines in which the doughnuts are progressed along a way by means of the flow of the cooking liquid, said control device including a revoluble member having its axis disposed transversely of the way at an elevation below the surface of the cooking liquid, a pair of grids, means having a transverse axis for pivoting said grids at corresponding ends thereof to said revoluble member, said grids extending downwardly into the cooking liquid and resting upon the bottom thereof, one of said grids extending up stream and the other extending down stream and means for periodically rotating said shaft through a complete revolution in one direction only.

ALEXANDER S. T. LAGAARD.